(12) United States Patent
Shirley, Jr. et al.

(10) Patent No.: US 12,162,809 B2
(45) Date of Patent: Dec. 10, 2024

(54) FERTILIZER USING CARBON DIOXIDE TO INCREASE PLANT YIELD AND METHOD OF INCREASING PLANT YIELD

(71) Applicant: Innovations for World Nutrition, LLC, Florence, AL (US)

(72) Inventors: Arthur R. Shirley, Jr., Florence, AL (US); Melissa C. Hayes, Florence, AL (US)

(73) Assignee: INNOVATIONS FOR WORLD NUTRITION, LLC, Florence, AL (US)

( * ) Notice: Subject to any disclaimer, the term of this patent is extended or adjusted under 35 U.S.C. 154(b) by 913 days.

(21) Appl. No.: 17/227,683

(22) Filed: Apr. 12, 2021

(65) Prior Publication Data

US 2021/0323889 A1 Oct. 21, 2021

Related U.S. Application Data

(60) Provisional application No. 63/010,090, filed on Apr. 15, 2020.

(51) Int. Cl.
| | |
|---|---|
| *C05G 1/00* | (2006.01) |
| *C05D 7/00* | (2006.01) |
| *C05F 5/00* | (2006.01) |
| *C05G 3/40* | (2020.01) |
| *C05G 5/18* | (2020.01) |
| *C05G 5/20* | (2020.01) |

(52) U.S. Cl.
CPC ............ *C05G 1/00* (2013.01); *C05D 7/00* (2013.01); *C05F 5/002* (2013.01); *C05G 3/40* (2020.02); *C05G 5/18* (2020.02); *C05G 5/20* (2020.02)

(58) Field of Classification Search
None
See application file for complete search history.

(56) References Cited

U.S. PATENT DOCUMENTS

| | | |
|---|---|---|
| 1,870,131 A | 8/1932 | Meier |
| 3,197,302 A | 7/1965 | MacBride |
| | (Continued) | |

FOREIGN PATENT DOCUMENTS

| | | |
|---|---|---|
| BR | 409658 | 4/1934 |
| BR | 1287749 | 6/1972 |
| | (Continued) | |

OTHER PUBLICATIONS

Britannica, The Editors of Encyclopaedia. "sodium". Encyclopedia Britannica, Jan. 7, 2019, <https://www.britannica.com/science/sodium>. (Year: 2019).

(Continued)

*Primary Examiner* — Wayne A Langel
(74) *Attorney, Agent, or Firm* — Jeffrey S. Melcher; Melcher Patent Law PLLC

(57) ABSTRACT

A fertilizer having a source of carbon dioxide, a source of nitrogen, and a source of carbohydrate, and an acid in an amount to provide increased retention of carbon dioxide in the soil. A method of enhancing the growth of plants by applying the fertilizer to soil containing the plant, the acid increasing retention of the carbon dioxide in the soil, and the plant exhibiting enhanced growth from the combination of the nitrogen, carbon dioxide and carbohydrate.

30 Claims, 1 Drawing Sheet

(56) References Cited

U.S. PATENT DOCUMENTS

| | | | |
|---|---|---|---|
| 3,506,432 | A | 4/1970 | Arita |
| 4,003,160 | A | 1/1977 | Muller |
| 4,026,695 | A | 5/1977 | Young |
| 4,559,076 | A | 12/1985 | Young |
| 4,571,256 | A | 2/1986 | Takagi |
| 5,044,117 | A | 9/1991 | Kuckens |
| 5,308,373 | A | 5/1994 | Moore |
| 5,338,551 | A | 8/1994 | Lajoie |
| 5,432,148 | A | 7/1995 | Winston |
| 5,443,835 | A | 8/1995 | Winston |
| 5,468,715 | A | 11/1995 | Joseph |
| 5,741,521 | A | 4/1998 | Knight |
| 5,849,060 | A | 12/1998 | Piping |
| 5,876,990 | A | 3/1999 | Reddy |
| 6,101,763 | A | 8/2000 | Aoki |
| 6,231,633 | B1 | 5/2001 | Hirano |
| 6,358,294 | B1 | 3/2002 | Atting |
| 6,387,145 | B1 | 5/2002 | Miele |
| 6,475,257 | B1 | 11/2002 | Baptist |
| 7,753,984 | B2 | 7/2010 | Liu |
| 7,776,124 | B2 | 8/2010 | Binder |
| 8,328,898 | B2 | 12/2012 | Liu |
| 8,609,145 | B2 | 12/2013 | Anderson |
| 8,883,677 | B2 | 11/2014 | Windhoevel |
| 8,940,074 | B2 | 1/2015 | Kuo |
| 8,979,970 | B2 | 3/2015 | Kucera |
| 9,174,885 | B2 | 11/2015 | Taulbee |
| 9,334,199 | B2 | 5/2016 | Kuo |
| 9,566,240 | B2 | 2/2017 | Burch |
| 9,682,894 | B2 | 6/2017 | Gabrielson |
| 2002/0174697 | A1 | 11/2002 | Reid |
| 2003/0061758 | A1* | 4/2003 | Wilson ............... A01M 13/006 43/124 |
| 2004/0200248 | A1 | 10/2004 | Kirkegaard |
| 2006/0003893 | A1 | 1/2006 | Pursell |
| 2011/0113843 | A1 | 5/2011 | Mantelatto |
| 2011/0174032 | A1 | 7/2011 | Liu |
| 2012/0103039 | A1 | 5/2012 | Brucher |
| 2014/0069001 | A1 | 3/2014 | Rose |
| 2015/0305251 | A1 | 10/2015 | Eyres |
| 2016/0031763 | A1 | 2/2016 | Kim |
| 2016/0280613 | A1 | 9/2016 | Wickstrom |
| 2016/0332929 | A1 | 11/2016 | McKnight |
| 2017/0008812 | A1 | 1/2017 | Kim |
| 2017/0152195 | A1 | 6/2017 | Terenzio |
| 2017/0166488 | A1 | 6/2017 | Chaudhry |
| 2019/0185390 | A1 | 6/2019 | Shirley |
| 2020/0102457 | A1 | 4/2020 | Goldstein |
| 2020/0068785 | A1 | 5/2020 | Geiger |

FOREIGN PATENT DOCUMENTS

| | | | |
|---|---|---|---|
| CN | 1088562 | | 6/1994 |
| CN | 1089932 | | 7/1994 |
| CN | 1136028 | | 11/1996 |
| CN | 1141276 | | 1/1997 |
| CN | 1240777 | A | 1/2000 |
| CN | 1296934 | | 5/2001 |
| CN | 1400196 | A | 3/2003 |
| CN | 1408680 | A | 4/2003 |
| CN | 1122652 | | 10/2003 |
| CN | 1629107 | | 6/2005 |
| CN | 101157580 | | 4/2008 |
| CN | 101195547 | | 6/2008 |
| CN | 101781137 | | 7/2010 |
| CN | 102515905 | | 6/2012 |
| CN | 102515911 | | 6/2012 |
| CN | 102584383 | | 7/2012 |
| CN | 10278356 | | 11/2012 |
| CN | 102936169 | | 2/2013 |
| CN | 102980959 | | 3/2013 |
| CN | 103304292 | | 9/2013 |
| CN | 103518456 | | 1/2014 |
| CN | 103539526 | | 1/2014 |
| CN | 103539556 | | 1/2014 |
| CN | 03570420 | | 2/2014 |
| CN | 103583175 | | 2/2014 |
| CN | 103621278 | | 3/2014 |
| CN | 03708891 | | 4/2014 |
| CN | 104045437 | | 9/2014 |
| CN | 104086268 | | 10/2014 |
| CN | 104262018 | | 1/2015 |
| CN | 104496685 | | 4/2015 |
| CN | 104557312 | | 4/2015 |
| CN | 104591818 | | 5/2015 |
| CN | 104829358 | | 8/2015 |
| CN | 104829362 | | 8/2015 |
| CN | 104973929 | | 10/2015 |
| CN | 105104060 | | 12/2015 |
| CN | 105347876 | | 2/2016 |
| CN | 105948892 | | 9/2016 |
| CN | 106316495 | | 1/2017 |
| CN | 106316532 | | 1/2017 |
| CN | 106748313 | | 1/2017 |
| CN | 106396772 | | 2/2017 |
| CN | 106576795 | | 4/2017 |
| CN | 106673843 | | 5/2017 |
| CN | 106722658 | | 5/2017 |
| CN | 106747771 | | 5/2017 |
| CN | 106818732 | | 6/2017 |
| CN | 107235814 | | 10/2017 |
| CN | 107266141 | | 10/2017 |
| CN | 108440141 | | 8/2018 |
| EP | 2716620 | | 9/2014 |
| FR | 1520587 | | 4/1968 |
| JP | 54130367 | | 10/1979 |
| JP | 5626796 | | 3/1981 |
| JP | H06105620 | | 4/1994 |
| WO | 9627288 | | 2/1996 |
| WO | 01/14285 | | 3/2001 |
| WO | 2009091570 | | 1/2009 |
| WO | 2010/077127 | | 7/2010 |
| WO | WO 2010/077127 | A1 * | 7/2010 ............... A23L 1/29 |
| WO | 2014/091095 | | 6/2014 |
| WO | 2014/101269 | | 7/2014 |
| WO | 2014106424 | | 7/2014 |
| WO | 2017068038 | | 4/2017 |

OTHER PUBLICATIONS

Invitation issued in PCT/US/26983, on Jul. 6, 2021, pp. 1-2.

Qiu, "Biostimulant Seed Coating Treatments to Improve Cover Crop Germination and Seedling Growth," Agronomy 2020, 10, 154; doi: 10.3390/agronomy10020154, www.mdpi.com/journal/agronomy Accepted: Jan. 19, 2020; Published: Jan. 22, 2020, pp. 1-14.

Office Action issued in U.S. Appl. No. 17/227,596, filed Jul. 8, 2021, pp. 1-33.

Zahid, "A comprehensive review on biodegradable polymers and their blends used in controlled release fertilizer processes," Rev., Chem. Eng. 2015; 31(1) pp. 69-95.

Kissel, "Management of urea fertilizers," Kansas State University, 1988.

Cai, et al. "Nitrogen loss from ammonium bicarbonate and urea fertilizers applied to flooded rice," Fertilizer Research 10.3 (1986): 203-215.

Black, et al. "Effects of form of nitrogen, season, and urea application rate on ammonia volatilisation from pastures," New Zealand Journal of Agricultural Research 28.4 (1985): 469-474.

Yong Zhang, "An Eco-Friendly Slow-Release Urea Fertilizer Based on Waste Mulberry Branches for Potential Agriculture and Horticulture Applications," Sustainable Chem. Eng. 2014, 2, 7, 1871-1878.

Yangfang. "k-CarrageenanSodium Alginate Beads and Superabsorbent Coated Nitrogen Fertilizer with Slow-Release, Water-Retention, and Anticompaction Properties," Ind. Eng. Chem. Res., 2012, 51 (3), pp. 1413-1422.

Chen Lung-Yie, et al. "Effect of deep-application of prilled ammonium bicarbonate fertilizer on the nitrogen supplying status of non-calcareous paddy soils." Acta Pedologica Sinica, 15, 75-82 (1978).

(56) References Cited

OTHER PUBLICATIONS

Li, et al. "Ammonium bicarbonate used as a nitrogen fertilizer in China." Fertilizer Research (1980) 1: 125.
Savant et al. "Deep placement of urea supergranules in transplanted rice: Principles and practices." Fertilizer Research (1990) 25: 1.
Song, et al. "Study on fertilizer efficiency and its mechanism of urea and ammonium bicarbonate treated with controlled-release technology." Journal fo Plant Nutrition and Fertilizer, 2003, 9(1): 50-56.
Higuchi, et al. "Further evidence for gaseous CO2 transport in relation to root uptake of CO2 in rice plant, Soil Sciene, and Plant Nutrition." 1984, 30:2, 125-136.
Enoch, et al. "Plant response to irrigation with water enriched with carbon dioxide." New Phytologist, 1993,125: 249-258.
Stolwijk, et al. On the Uptake of Carbon Dioxide and Bicarbonate by Roots, and Its Influence on Growth. Plant Physiol. 1957;32(6):513-20.
Harris-Lovett. (Jul. 22, 2015) GMO rice could reduce greenhouse gas emissions, study says. Retrieved from http://www.latimes.com.
Ikeda, et al. (1992) Stimulation of dark carbon fixation in rice and tomato roots by application of ammonium nitrogen, Soil Science and Plant Nutrition, 38:2, 315-322.
Bergquist, (1964) Absorption of Carbon Dioxide by Plant Roots, Botaniska Notiser, 117:3, 249-261.
Allen, et al. (2005) Crop Responses to Elevated Carbon Dioxide and Interaction with Temperature, Journal of Crop Improvement, 13:1-2, 113-155.
Colmer, et al. (2006), Root aeration in rice (Oryza sativa): evaluation of oxygen, carbon dioxide, and ethylene as possible regulators of root acclimatizations. New Phytologist, 170: 767-778.
Wikipedia. "Soil Test." Version: Jun. 25, 2017. (Jun. 25, 2017) Retrieved: Feb. 8, 2019 (Feb. 8, 2019). wikipedia.org.
Livingston. "The Soil as Direct Source of Carbon Dioxide for Ordinary Plants" Plant physiology vol. 9,2 (1934): 237-59.
Leonard. "Effect of Various Oxygen and Carbon Dioxide Concentrations on Cotton Root Development" Plant Physiology Jan. 1946, 21 (1) 18-36.
Madhu. "Dynamics of Plant Root Growth Under Increased Atmospheric Carbon Dioxide" Agron. J. (2013) 105:657-669.
Lowe. "Carbon Dioxide Requirement for Growth of Legume Nodule Bacteria" Soil Science vol. 94, 6 (1962): 351-356.
Ma. "An inorganic CO2 diffusion and dissolution process explains negative CO2 fluxes in saline/alkaline soils" Sci. Rep. 3, 2025 (2013): 1-7.
Majeau. "Effect of CO2 Concentration on Carbonic Anhydrase and Ribulose-1,5-Biphosphate Carboxylase/Oxygenase Expression in Pea" Plant Physiol. vol. 112 (1996): 569-574.
Matocha. "Effects of carbon dioxide and iron enrichment of a calcareous soil on Fe-chlorosis, root and shoot development of grain sorghum." Journal of Plant Nutrition. vol. 11, 6-11 (1988): 1503-1515.
Mauney. "Responses of Glasshouse Grown Cotton to Irrigation with Carbon Dioxide-Saturated Water." Crop Sci. vol. 28, 5 (1088): 835-838.
Miller. "Carbon Dioxide-Bicarbonate Absorption, Accumulation, Effects on Various Plant Metabolic Reactions, and Possible Relations to Lime-Induced Chlorosis." Soil Sci. vol. 89, 5 (1960): 241-245.
Mingo-Castel. "Effect of Carbon Dioxide and Ethylene on Tuberization of Isolated Potato Stolons Cultured in Vitro." vol. 53 (1974) 798-801.
Shingo. The intake and utilization of carbon by plant roots from C14-labeled urea Part I. The determination of radioactive carbon of plant materials and a preliminary seedling experiment utilizing C14-labeled urea. Soil Sci. and Plant Nutrition vol. 3,1 (1957): 59-64.
Moore. "Potential for Irrigation with Carbon Dioxide." Acta Hortic. (1990). www.actahort.org.
Niu. "Effect of elevated CO2 on phosphorus nutrition of phosphate-deficient Arabidopsis thaliana (L.) Heynh under different nitrogen forms." Journal of Experimental Botany, vol. 64,1 (2013): 355-367.
Nobel. "Soil O2 and CO2 Effects on Root Respiration of Cacti." Plant and Soil. 120,2 (1989). 263-271.
Novero. "Field-grown tomato response to carbonated water application." Agronomy journal. vol. 83, 5 (1991): 911-916.
Noyes. "Root Variations Induced by Carbon Dioxide Gas Additions to Soil." Botanical Gazette. vol. 66, 4 (1918): 364-373.
Noyes. "Residual Effects of Carbon Dioxide Gas Additions to Soil on Roots of Lactuca sativa." Botanical Gazette. vol. 69,4 (1920): 332-336.
Noyes. "Effects of Saturating Dioxide." Science. vol. 40, 1039 (1914): 792.
Paliwal. "Effect of bicarbonate-rich irrigation waters on the growth, nutrient uptake and synthesis of proteins and carbohydrates in wheat." Plant Soil vol. 43, 1-3 (1975): 523-536.
Palmer. "Cytokinins and Tuber Initiation in the Potato Solanum tuberosum L." Nature. vol. 221 (1969): 279-280.
Mitsui. "On the utilization of carbon in fertilizers through rice roots under pot experimental condition." Soil Science and Plant Nutrition. vol 8,6 (1962): 16-23.
Radford. "New Research Shows Tree Roots Regulate CO2, Keep Climate Stable." Version: Feb. 19, 2014. (Feb. 19, 2014) Retrieved: Jan. 25, 2016 (Jan. 25, 2016). ecowatch.com.
Ryan. "Effect of Surface-Applied Sulfuric Acid on Growth and Nutrient Availability of Five Range Grasses in Calcareous Soils." Journal of Range Management. vol. 28, 5 (1975): 411-414.
Skelding. "The Effect of Carbon Dioxide on the Absorption of Manganese by Root Tissues of Red Beet." Ann Bot. vol. 21, 1 (1957): 121-141.
Skok. "Upate of CO2 by roots of Xanthium plants." Bot. Gaz. 124 (1962): 118-120.
Stoter. "Radioactive Anomalies from Old CO2 in the Soil and Canopy Air." Radiocarbon. vol. 53, 1 (2011): 55-69.
Spittstoesser. "Dark CO2 Fixation and its Role in the Growth of Plant Tissue." Plant Physiol. 41, 5 (1966) 755-759.
Stemmet. "The Uptake of Carbon Dioxide by Plant Roots." Plant and Soil. vol. 17, 3 (1962): 357-364.
Storlie. "Soil, plant, and canopy responses to carbonated irrigation water." Hort. Technology. vol 6, 2 (1996): 111-114.
Sun. "Effects of elevated CO2 Applied to Potato Roots on the Anatomy and Ultrastructure of Leaves." Biologia Plantarum vol. 55, 4 (2011): 675-680.
Unger. "Influence of Oxygen and Carbon Dioxide on Germination and Seedling Development of Corn (Zea mays L.)." Agronomy Journal. vol. 57, 1 (1965): 56-58.
Fernandez, Fabian G., et al. "Managing nitrogen." Illinois agronomy handbook, 24th ed. Univ. of Illinois, Urbana—Champaign, IL ( 2009): 113-132. (Year: 2009).
Isleib, Jim. "Pros and cons of granular and liquid fertilizers." Michigan: Michigan State University Extension (2016). (Year: 2016).
Nutrient Stewardship "Split Fertilizer Application Helps Optimize Nutrient Management" <https://nutrientstewardship.org/ implementation/spl it-fertilizer-application-helps-optimize-nutrient-management/> (Year: 2020).
Fubon "Vinasse" Angel Yeast, 2022 (Year: 2022).
Allance. "What Are Different Types of Fertilizer?" <https ://www. fertilizer-machine. net/solution_and_market/types-of-fertil izer. html> Feb. 21, 2016 (Year: 2016) 020878.
IntelliStellar. "Agriculture Grade Ammonium Bicarbonate Market Research Report Unlocks Analysis on the Market Financial Status, Market Size, and Market Revenue upto 20" Published Sep. 29, 2023<https://www.linkedin.com/pulse/agriculture-grade-ammonium-bicarbonate-market-research/> (Year: 2023).
European Search Report issued in EP Application No. 21787724.0, Apr. 18, 2024, pp. 1-26.
European Search Report issued in EP Application No. 21788794, Apr. 18, 2024, pp. 1-29.
Qiu, Ruofeng, Zhongping Huang, and Lili Wang. "Analysis of fatty acid composition in cottonseed by gas chromatography with on-line pyrolytic methylation." Se pu= Chinese Journal of Chromatography 36.9 (2018): 925-930. (Year: 2018).

(56) References Cited

OTHER PUBLICATIONS

Jibrin, H., et al. "Nutritive and phytochemical assessment of cotton (*Gossypium* spp.) seed meal for fish feed." Int. J. Fish Aquat. Stud 8 (2020): 380-385. (Year: 2020).
Harrell, D. L., J. A. Bond, and J. Saichuk. "Soils, plant nutrition and fertilization." Louisiana rice production handbook. Pub 2321 (2009): 23-34. (Year: 2009).
Dijkstra, "Diet Effects on urine composition of cattle and N2O emmissions," Animal (2013), The animal Consortium, pp. 1-12.
Anticaking agent, wikipedia, Jan. 3, 2022, pp. 1-2.
Viktor. "The influence of root assimilated inorganic carbon on nitrogen acquisition/assimilation and carbon partitioning." New Phytol. 165, 1 (2005): 157-69.
Vuorinen. "Dark CO2 fixation by roots of willow and barley in media with a high level of inorganic carbon." Journal of Plant Physiology. vol. 151, 4 (1997): 405-408.
Hernandez. "Different Bacterial Populations Associated with the Roots and Rhizosphere of Rice Incorporate Plant-Derived Carbon." Appl Environ Microbiol. vol. 81 (2015): 2244-2253.
Bugbee. "CO2 crop growth enhancement and toxicity in wheat and rice." Adv. Space Res. vol 14, 11 (1994): 257-267.
Razzaque. "Effects of Nitrogen Fertilizer and Elevated CO2 on Dry Matter Production and Yield of Rice Cultivars." Bangladesh J. Agril. Res. 34,2 (2009): 313-322.
Allen. "The CO2 fertilization effect: higher carbohydrate production and retention as biomass and seed yield." Global climate change and agricultural production. direct and indirect effects, Chapter 39. (1996).
Brix. "Uptake and photosynthetic utilization of sediment-derived carbon by Phragmites australis (Cav.) Trin. ex Steudel." Aquatic Botany. vol. 38, 4 (1990): 377-389.
Cannon. "On the Relation of Root Growth and Development to the Temperature and Aeration of the Soil." American Journal of Botany. vol. 2, 5 (1915): 211-224.
Chang. "Effect of Carbon Dioxide on Absorption of Water and Nutrients by Roots." Plant Physiol. vol. 20, 2 (1945): 221-232.
Cramer. "Inorganic carbon fixation and metabolism in maize roots as affected by nitrate and ammonium nutrition." Physiologia Plantarum. vol 89, 3 (2006): 632-639.
Dilorio. "Carbon dioxide improves the growth of hairy roots cultured on solid medium and in nutrient mists." Applied Microbiology Biotechnology. vol 37 (1992): 463-467.
Gorski. "1986: Response of eggplant solanum melogena to a root environment enriched with carbon dioxide." Hortsciencesect. vol 1 (1986): 495-498.
Grinfield. "On the Nutrition of Plants with Carbon Dioxide through the Roots." Physiology of Plants. vol. 97, 5 (1954).
Jin. "Elevated Carbon Dioxide Improves Plant Iron Nutrition through Enhancing the Iron-Deficiency-Induced Responses under Iron-Limited Conditions in Tomato." Plant Physiology. vol. 150 (2009): 272-280.
Written Opinon and International Search Report issued in corresponding PCT/US18/65373, Feb. 27, 2018, pp. 1-41.
Prior art search conducted Jan. 4, 2018, PatPro Inc., Taun Nguyen, pp. 1-7.
Subbaiah, S.V., et al. "Studies on yield maximization through balanced nutrient ratios in irrigated lowland rice." International Rice Commission Newsletter (FAO), 50 (2001): 59-65.
Demand for Chapter II and Response to Written Opinion filed in corresponding PCT/US18/65373, filed May 15, 2019, pp. 1-34.
International Preliminary Report on Patentability issued in PCT/US18/065373, Aug. 27, 2019, pp. 1-13.

\* cited by examiner

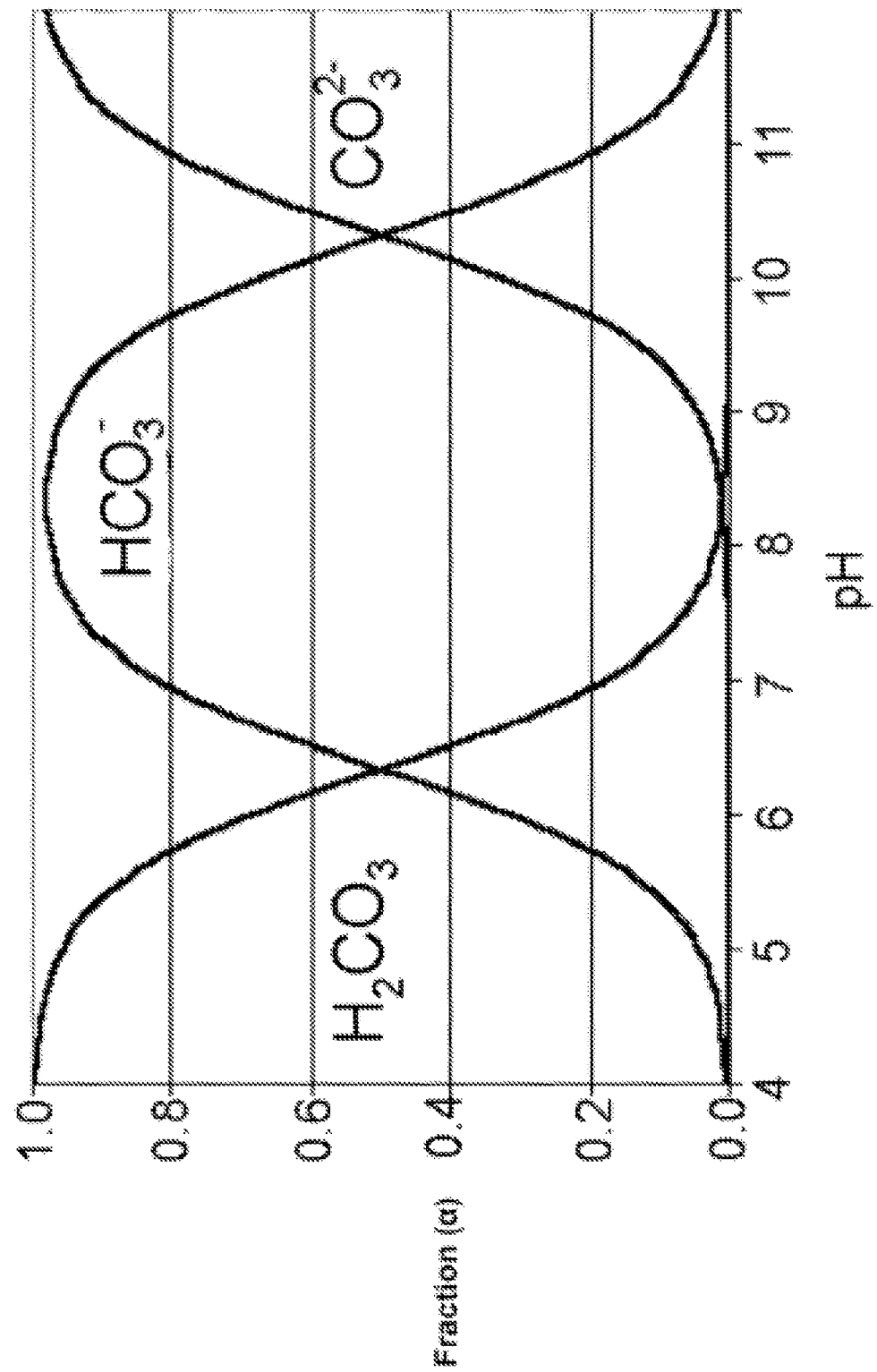

FERTILIZER USING CARBON DIOXIDE TO INCREASE PLANT YIELD AND METHOD OF INCREASING PLANT YIELD

FIELD OF THE INVENTION

The invention relates to a fertilizer comprising a source of carbohydrate, a source of nitrogen, a source of carbon dioxide, and a source of acid; and a method of growing plants using the fertilizer.

BACKGROUND OF THE INVENTION

Due to rising populations around the world and limited arable land for growing food, finding ways to improve food production is a serious concern. It is well known that plants need nitrogen, phosphorus, potassium, micronutrients, water and carbon dioxide to grow. Of the three major nutrients: nitrogen, phosphorus, and potassium; nitrogen is needed at the highest level to promote optimal growth. For example according to Subbaiah, et al, a $N:P_2O_5:K_2O$ ratio of 4:2:1 is recommended for growing rice {Subbaiah, S. V., et al. "Studies on yield maximization through balanced nutrient ratios in irrigated lowland rice." International Rice Commission Newsletter (FAO), 50 (2001): 59-65}. However, the carbon required by plants such as a rice plant and its grain is much higher than its need for nitrogen, phosphorus, or potassium. The required nitrogen is typically higher than for phosphorus, potassium and other nutrients. Measurements of 46 w/w % or more carbon and only 1.3 w/w % nitrogen are common for rough rice (the whole rice grain with the hull). These carbon and nitrogen values result in a carbon:nitrogen (C:N) ratio for rough rice of 35:1. This high C:N ratio illustrates that the amount of carbon needed to promote plant growth and yield dramatically outweighs all of the other nutrients.

It is typically accepted that plants obtain carbon dioxide from the surrounding air through the stomata in their leaves. However, the amount of carbon dioxide in air is extremely low (currently about 355 ppm). Carbon is a limiting nutrient in plant growth, and thus finding other ways to supply carbon dioxide to plants have been investigated for years. It is well known that supplying gaseous $CO_2$ to plant leaves increases yield and is a common practice for greenhouse horticulture.

When a plant seed first sprouts, the only nutrients and energy available for growth are stored in the seed. Initially, the roots form and then the leaves. The leaves of the small seedling have very little surface area, and photosynthesis is limited to the amount of energy the leaves can accept as well as carbon available to build new plant cells. If a plant is stimulated to produce early roots, it gives the plant a head start that allows it to more efficiently take up nutrients including carbon that can be at the roots. The present invention stimulates the growth of plant roots early in their development by providing carbon. The present invention also supplies plant roots with nitrogen and other nutrients and with additional uptake-available carbon and energy-rich carbohydrates to promote rapid growth that helps to overcome the low surface area of early leaves and therefore further increases plant growth. This early root and plant growth benefit carries on through the whole life cycle of the plant and results in increased crop yields.

It is known to grow algae and cyanobacteria, commonly referred to as blue-green algae, in a water regime, wherein the algae is supplied carbon dioxide either as gaseous $CO_2$ or as bicarbonate to dramatically increase growth. Algae is also grown in the dark using sugar or starch as its energy and carbon source. Now, with a present invention a new fertilizer has been developed to supply energy and nutrients including carbon dioxide, to the roots of plants. Special attention has been paid to developing this fertilizer for plants grown in a water saturated regime and to date this has been most effective. The present inventive fertilizer is greatly effective in growing hydrophilic plants including rice, wild rice (genus: *Zizania*), sugar cane, water chestnuts, lotus, taro, water spinach, watercress, water celery, arrowroot, sago palm, nipa palm, marsh type or fen grasses such as *Saccharum* hybrids, and other biomass crops such as bald cypress and *eucalyptus*. The inventive fertilizer is effective in growing all types of plants. The plants can be grown in soil or hydroponically. Preferred agricultural cropsf include corn, wheat, soybeans, and cotton.

Without being bound by any theory, the inventors believe the inventive fertilizer enhances early root growth of plants and early plant growth.

In the past, studies into supplying carbon dioxide to the roots of plants have led to mixed results. Some of these studies have shown increased root growth and improved nutrient uptake. U.S. Pat. No. 5,044,117 (U.S. '117) discloses a method of fertilization that supplies gaseous carbon dioxide and oxygen to the roots of plants grown hydroponically to improve growth. The present invention provides carbon dioxide to plant roots in a water regime but in contrast with U.S. '117, the present novel fertilizer does not provide oxygen and contains energy rich carbohydrates as well as nitrogen and acid.

Urea has been developed as an excellent fertilizer for use with many crops because of its low cost and high nitrogen content. Urea in the presence of water and urease catalyst (naturally occurring in soil) undergoes hydrolysis to produce ammonia and carbamate which further decomposes to ammonia and carbon dioxide as shown in the following equation:

$$(NH_2)_2CO + H_2O \rightarrow NH_3 + H_2NCOOH \rightarrow 2NH_3 + CO_2 \qquad (1)$$

As can be seen from reaction (1), using urea as a fertilizer also produces carbon dioxide.

Shown in present FIG. 1 is a graph of the relationship between the form of dissolved carbon dioxide and solution pH. This graph shows that when the pH of the solution is below about 6.3, the majority of the carbon dioxide in solution is as carbonic acid.

Chinese patents CN1240777A, CN1400196, and CN1408680A recognize the plant yield benefits of supplying gaseous carbon dioxide produced from a solid fertilizer placed in the soil. The ingredients in these solid fertilizers are designed to react with each other to release carbon dioxide gas to plant leaves for plants grown in a covered or protected environment such as in a greenhouse rather than supplying carbon to the plant roots as carbon dioxide and carbohydrates as in the present invention. CN1240777A combines ammonium bicarbonate with a solid acid made by reacting sulfuric acid, nitric acid, lignite, and powdered phosphorus ore; CN1400196 uses calcium carbonate (limestone) as the carbon dioxide source and combines it with sulfur and ammonium phosphate; and CN1408680A uses ammonium bicarbonate as the carbon dioxide source and combines it with bisulfates or bisulfites. By producing the carbon dioxide in gaseous form from the reaction of the fertilizer ingredients, the carbon in the fertilizers of these Chinese patents is inefficient unless it is used in a contained environment like a greenhouse. The present invention holds the carbon in soil solution as a carbonic acid or as dissolved carbon dioxide at the plant roots and therefore can be used to make carbon available to plants in open fields. In addition, the present invention includes nitrogen and carbohydrates in the fertilizer and these supply both additional carbon and energy to the plant. This additional energy and carbon source is not employed in any of these Chinese patents. Finally, the fertilizer of the present invention provides an unexpected measurable synergism among the components of the fertilizer to increase crop yield, improve efficiency of nitrogen uptake by the plant, improve nitrogen (protein) levels in plant products, and increase plant uptake of carbon dioxide more than an additive effect.

Lowering fertilizer nitrogen losses when used in growing crops as a result lowers NOx emissions from growing those crops with nitrogen fertilizer and thereby the contribution to greenhouse gases is also decreased. The inventive fertilizer can surprisingly reduce nitrogen losses, thereby reducing undesirable greenhouse gases.

DESCRIPTION OF DRAWINGS

FIG. 1—shows a graph of the fraction of various forms of carbon dioxide found in solution at atmospheric pressure as a function of pH, graph from Utah State University, www.usu.edu.

SUMMARY OF THE INVENTION

An objective of the invention is to provide a novel fertilizer for increasing plant root growth and plant crop yield.

The invention includes a fertilizer used to produce increased yields in crops, increased root growth, improve efficiency of nitrogen uptake by the plant, improve nitrogen levels in plant products, and increase plant uptake of carbon in crops. The present invention provides nitrogen to the plants; supplies energy and carbon in the form of plant available carbohydrates such as for instance seed grind, starch, and/or sugar to the plant roots early in the plant growth; supplies carbon dioxide to the roots of plants by applying carbon dioxide early in the plant growth in the form of a solid, gas, liquid, suspension, or slurry; and takes advantage of the fertilizer's ability to make available other carbon sources to the plant.

The invention can be in solid, semi-solid, or liquid form as desired for the particular application and/or plant growth environment. The plant can be grown in soil or hydroponically.

The inventive fertilizer comprises a source of nitrogen from sources such as urea, ammonium bicarbonate, ammonium sulfate, ammonium nitrate, monoammonium phosphate (MAP), diammonium phosphate (DAP), urea ammonium nitrate (UAN), or a combination of these; a source of carbon dioxide such as dry ice, carbon dioxide gas, liquid carbon dioxide, suspensions containing carbon dioxide, solutions of carbon dioxide, and slurries containing carbon dioxide; a source of carbohydrate chosen from at least one of a seed grind, starch, or sugar; and a source of acid chosen as at least one from the group phosphoric acid, sulfuric acid, nitric acid, hydrochloric acid, or organic acids. This combination of ingredients including nitrogen, carbon dioxide, carbohydrate, and acid provides a measurable unexpected synergism demonstrated as unexpected increase in crop yield, improved efficiency of nitrogen uptake by the plant, improved nitrogen levels in plant products, and increased plant uptake of carbon dioxide.

The present invention is free of components unsuitable for use as a fertilizer to grow plants. Hence, the fertilizer is free of components harmful to humans or animals such as lithium and heavy metals. For this invention free means that the levels meet the limits set by government for land application and that the levels are below accepted levels that are shown to cause harm to humans or animals consuming the plant or crop.

If soil tests show the soil to be deficient in one or more nutrients, then a starter fertilizer that contains a small amount of nitrogen with other primary nutrients, secondary nutrients, and micronutrients at the levels indicated by the soil test can be applied. This starter fertilizer can be applied at, before, or just after planting and prior to the application of the present inventive fertilizer. Alternatively, the starter fertilizer can also be applied with or as part of the inventive fertilizer.

The inventive fertilizer is preferably applied as a solid, a liquid, a suspension, a slurry or gas to the soil surface or beneath the soil surface. The fertilizer ideally works for crops such as rice, wild rice (genus: *Zizania*), sugar cane, water chestnuts, lotus, taro, water spinach, watercress, water celery, arrowroot, sago palm, nipa palm, marsh-type or fen grasses such as *Saccharum* hybrids, and other biomass crops such as bald cypress and *Eucalyptus* grown under flooded or high moisture conditions. The inventive fertilizer is also effective for growing all types of plants including but not limited to corn, cotton, wheat, soybeans, cassava, sugar beets, energy grasses such as *Miscanthus, Pennisetum purpureum*, Switchgrass, and other prairie grasses or crops.

The inventive fertilizer can produce increased plant growth for all types of plants including but not limited to trees, bushes, ornamental plants, vegetables, fruits, vines, and more regardless of whether the plants are grown from seeds, rhizomes, tubers, roots, grafts, or any other method of starting plants. The inventive fertilizer can be especially beneficial to seedlings that are transplanted. For example, the invention can shorten the time for a transplanted seedling to reach maturity after transplanting.

The present invention includes methods of applying the inventive fertilizer, including multiple applications, i.e., an application of the inventive fertilizer very early such as at planting the seed followed by later additional applications still very early in the plant growth when the plant most benefits from additional carbon dioxide and energy at the roots.

Thus, the invention includes methods of multiple applications of the inventive fertilizer wherein a first application of fertilizer or can be applied when a seed is planted and at least one more application of fertilizer can be applied between 2 weeks and 8 weeks after the seed is planted. For all of these multiple applications, the invention can be applied when the seed is planted and again when the seedling is transplanted.

An alternative embodiment of the invention is comprised of a source of nitrogen, a source of carbon dioxide and a source of acid.

Another alternative embodiment of the invention is comprised of a source of nitrogen, a source of carbon dioxide and a source of carbohydrate.

Without being bound by any theory, the inventors believe that using a seed grind formed from ground up seeds increases the available seed ingredients used to grow the initial roots from a seed, which greatly enhances the initial root growth. The early growth of roots is far more beneficial then enhancement of plant growth later in the growing cycle. For example, plants having enhanced early root growth stay ahead of other plants not having enhanced early root growth throughout the entire growing season. Preferably, a seed grind is formed from the same type of seed to be grown. For example, for growing rice, ground up rice seeds (seed grind) is preferably used to enhance the early growth of roots from the seed. However, other types of seed grind (non-rice seeds) can be used as an enhancer for rice. For example, rice seed grind has been found to be effective at enhancing the early growth of roots from cotton seeds. The seed can be coated with the seed grind.

A source of carbohydrate of the invention can be any seed grind. However, the seed grind contains more than just a carbohydrate. As discussed previously, the seed grind provides other seed ingredients required to grow the initial roots. Thus, an embodiment of the invention is the use of seed grind to grow initial roots from seed.

DETAILED DESCRIPTION OF THE INVENTION

It is well documented by agronomists that when a plant has a head start, it is always a healthier and more productive plant. A set of tests is performed using a unique approach to observe early root growth without damaging the plants. This is accomplished by planting seeds in cups of soil where the cup is transparent. This transparent cup is then placed inside an opaque cup. The seeds are planted in the soil against the inside surface of the transparent cup so that roots are checked simply by pulling the transparent cup out of the opaque cup and then replacing it when finished with the observation. The opaque cup protects the roots from light during growth. The roots are viewed and pictures taken without disturbing the plants as they are developing and therefore a view of the early growth of the roots is possible. Seeing the early roots reveals how quickly they develop and allows them to be compared with roots for baseline tests and thereby shows the extreme benefits of early application of the invention even before significant plant leaves are formed. These observations and the crop yields obtained later for the plants that are transplanted from the cups demonstrates that early improved root development for the invention results in increased plant growth and increased crop yield. Even early in the plant growth, the improvements in the roots of the plants receiving the inventive fertilizer are dramatically evident to the observer. This is because the plant's need for carbon dioxide and energy is supplied before the leaves of the plants can provide them.

For this description, improved nitrogen efficiency means that nitrogen loss to the atmosphere and to leaching is reduced by increasing the plant's ability to take up nitrogen early. Improved carbon uptake efficiency means that plants are able to utilize available carbon sources in the fertilizer, soil, and atmosphere more than plants grown under similar conditions with fertilizers supplying the same levels of primary nutrients (nitrogen, phosphorus, and potassium), secondary nutrients (sulfur, calcium, and magnesium), and the same level of micronutrients such as for example zinc, boron, iron, copper, manganese, molybdenum, or selenium. The plant utilization of carbon is measured as increased root mass, increased foliage mass, and when present, increased crop yield of plant product, such as for example grain.

For this description, crop yield refers to the weight of plant product per unit growing area, wherein the plant product is the part of the plant that is valuable as a commercial product, such as grain for example. Crop yield is typically expressed as kg/hectare, tonnes/hectare, bushels/acre, or pounds/acre depending on the type of crop grown.

For this description, the amount of protein in the crop plant product refers to the weight percent of protein found in the crop plant product, such as grain for example. The protein level is quantified by measuring the weight % of nitrogen in the crop plant product.

For this description, early in the plant growth means before the plant foliage weight reaches 5% of the plant foliage weight at harvest and preferably before the plant foliage weight reaches 2% of the plant foliage weight at harvest and most preferably some placed at planting.

The invention is used to produce increased yield in crops, increased root growth, improve efficiency of nitrogen uptake by the plant, improve nitrogen levels in plant products, and increase plant uptake of carbon in crops. The present invention provides nitrogen, carbon dioxide and energy rich carbohydrates and takes advantage of the invention's ability to make available other nutrient sources to the plant.

At planting and prior to or with the application of the present inventive fertilizer, a starter fertilizer can be applied to the soil days before, at, or shortly after planting. This starter fertilizer is chosen based on the needs for the plants being grown and the levels of nutrients available in the soil. These nutrient levels applied are adjusted to meet plant needs at seeding and at subsequent applications. The starter fertilizer contains preferably starter nitrogen in the form of a nitrogen fertilizer such as urea, ammonium nitrate, ammonium sulfate, potassium nitrate, mono ammonium phosphate (MAP), diammonium phosphate (DAP), urea-ammonium nitrate (UAN), ammonium bicarbonate, and sodium nitrate. In addition, the starter fertilizer can include other nutrients and micronutrients recommended based on the crop being grown and soil tests results on the soil used to grow the crop. Other nutrients in the starter fertilizer recommended based on soil testing can include phosphorus from fertilizers such as MAP, DAP, triple super phosphate and super phosphate; potassium from fertilizers such as potassium chloride and potassium sulfate; sulfur from elemental sulfur and a variety of sulfate fertilizers; and micronutrients such as magnesium, calcium, zinc, boron, manganese, iron, and more.

The starter fertilizer can comprise one or more of the following nutrients: nitrogen compounds selected from but not limited to the group consisting of urea, ammonia, ammonium nitrate, ammonium sulfate, calcium nitrate, diammonium phosphate (DAP), monoammonium phosphate (MAP), potassium nitrate, ammonium bicarbonate, or sodium nitrate; phosphorous compounds selected from but not limited to the group consisting of triple super phosphate, super phosphate, diammonium phosphate, monoammonium phosphate, monopotassium phosphate, dipotassium phosphate, tetrapotassium pyrophosphate, or potassium metaphosphate. potassium compounds selected from but not limited to the group consisting of potassium chloride, potassium nitrate, potassium sulfate, monopotassium phosphate, dipotassium phosphate, tetrapotassium pyrophosphate, or potassium metaphosphate. secondary nutrients, or micronutrients sources selected from the group consisting of elemental sulfur, calcium carbonate (limestone), dolomite, gypsum, shell, marl, iron sulfate, iron oxides, chelated iron, iron nitrate, zinc sulfate, zinc oxide, chelated zinc, zinc-oxysulfate, zinc carbonate, copper oxide, copper sulfate, copper nitrate, magnesium nitrate, magnesium sulfate, magnesium oxide, magnesium carbonate, selenium sulfate and selenium oxide, sodium tetraborate decahydrate (borax), sodium tetraborate pentahydrate, sodium tetraborate-pentaborate, colemanite, boric acid, ammonium molybdate, sodium molybdate, molybdic oxide, or manganese sulfate. liquid nutrient sources selected from the group consisting of urea-ammonium nitrate (UAN), ammonia, bio slurries, or other slurries and suspensions. Organic nutrient sources can, for example, be selected from the group consisting of manures, animal litters, or others.

One embodiment of the invention is a liquid, suspension, or slurry fertilizer comprised of a nitrogen source, a source of carbon dioxide selected from one or more of liquid carbon dioxide, dissolved carbon dioxide, a suspension containing carbon dioxide, or slurries containing carbon dioxide; and a source of carbohydrate chosen from a group of sources of carbohydrates such as at least one of a seed grind, starch, or sugar; and a source of acid selected from one or more of phosphoric acid, sulfuric acid, hydrochloric acid, nitric acid, or organic acids.

In a preferred embodiment, the inventive fertilizer comprises of a ratio of weight of carbon dioxide to weight of the source of carbohydrate of between 10:1 and 0.5:1. The source of acid is preferably in an amount needed to acidify the soil surrounding the roots of the plant to a pH range of between 4.5 and 6. The amount of source of acid in the fertilizer required to provide a pH of between 4.5 and 6 can be determined by forming an aqueous solution of the source of nitrogen, the source of carbon dioxide and the source of carbohydrate and then measuring while adding the source of acid to the aqueous solution until the pH is a desired amount between 4.5 and 6, which amount of source of acid to provide the desired pH can be utilized in the fertilizer. The source of acid can be in solid, semi-solid, or liquid form.

Using an acid in the invention produces an unexpected increase in crop yield as compared to crop yield produced when the invention is applied without the acid. The inventors believe that this increase in yield is due to increased levels of dissolved carbon dioxide held in the soil solution as a result of the acid addition. This acid is also added preferably based on the soil conditions in which the plant is grown.

Another embodiment of the invention is a solid fertilizer comprised of a source of nitrogen; a source of carbon dioxide made up of dry ice; a source of carbohydrate chosen from a group of sources of carbohydrates such as at least one of a seed grind, starch, or sugar; and a source of acid selected from one or more of phosphoric acid, sulfuric acid, hydrochloric acid, nitric acid, or organic acids.

An alternative embodiment of the invention is a solid fertilizer comprised of a solid nitrogen source such as urea for example that is further comprised of carbon dioxide gas and source of carbohydrate trapped within the solid nitrogen source.

A preferred embodiment of the invention is dry ice that comprises also brown rice seed grind and urea or is mixed with brown rice seed grind and urea. The dry ice also contains acid and a source of nitrogen. This solid invention can be either as powder, flakes, or pellets.

Rice seed grind, and in particular brown rice seed grind, and more particularly rough rice seed grind is a preferred carbohydrate because it is comprised of more than just starch. It also is comprised of nitrogen and other nutrients, secondary nutrients, and micronutrients that help to promote plant growth and crop yield.

The source of carbohydrate of the invention provides more than just carbohydrates by using seed grind. Seed grind is the powdery ground grain (seed) of a plant. The seed grind may include the bran of the grain as is the case for brown rice seed grind. The seed grind used in the invention may also include the ground hull of the grain that also contains nutrients beneficial for plant growth. Preferably, the seed grind is formed from the same type of plant to be grown. For example, for rice, a preferred seed grind is rough rice seed grind. Seed grind can include other ingredients such as one or more of the group comprising additional plant parts, dirt and/or other contaminants, molds, fungi, dispersing agents, parting agents, binders, bacteria, herbicides, pesticides, fungicides, and/or stabilizers, and/or other contaminants or additives. This seed grind does not require the use of seed that has been cleaned to levels for human consumption.

Seed grind contains many benefits for plants. For example, Table 1 shows a comparison of energy and nutrients of various seeds, according to USDA Nutrient Database (https://fdc.nal.usda.gov/).

TABLE 1

Energy and Nutrients in Selected Seeds and Starch
Nutritional Value per 100 g

|  | Brown Rice | White Rice | Whole Wheat | Corn Meal (Corn Seed Grind) | Corn Starch |
| --- | --- | --- | --- | --- | --- |
| Energy | 370 kcal | 370 kcal | 332 kcal | 361 kcal | 375 kcal |
| Carbohydrates | 77.24 g | 81.68 g | 74.48 g | 76.85 g | 87.5 |
| Sugars | 0.85 g | Not reported | 1.02 g | 0.64 g | 0 |
| Dietary Fiber | 3.52 g | 2.8 | 13.1 g | 7.3 g | 0 |
| Fat | 2.92 g | 0.55 g | 1.95 g | 3.86 g | 0 |
| Protein | 7.82 g | 6.81 g | 9.61 g | 6.93 g | 0 |
| Calcium | 23 mg | 11 mg | 33 mg | 7 mg | 0 |
| Iron | 1.47 mg | 1.6 mg | 3.71 g | 2.38 mg | 0 |
| Magnesium | 143 mg | 23 mg | 117 g | 93 mg | 0 |
| Phosphorus | 333 mg | 71 mg | 323 mg | 272 mg | 0 |
| Potassium | 223 mg | 77 mg | 394 mg | 315 mg | 0 |
| Selenium | 23.4 µg | 15.1 µg | 12.7 µg | 15.4 µg | 0 |
| Sodium | 7 mg | 7 mg | 3 mg | 5 mg | 0 |
| Zinc | 2.02 mg | 1.2 mg | 2.96 mg | 1.73 mg | 0 |

Brown rice also contains many vitamins. As can be seen from Table 1, brown rice contains energy including carbohydrates and sugars as well as nutrients that are beneficial to plant growth. Brown rice seed grind contains more than white rice seed grind. Similarly, corn meal (corn seed grind) contains nutrients not found in corn starch.

Thus, seed grind including the whole seed provides more benefit to the growth of plants than seed grind that includes only seed without the hull, coating, and/or bran. Thus, a preferred seed grind of the invention includes seed grind comprising one or more selected from the group rough rice seed grind, brown rice seed grind, whole wheat seed grind, wheat seed grind that includes the hull, corn seed grind, and/or other whole grains and/or whole grains with hulls.

A particle size range of a seed grind can be preferably 95% of the particles by weight between 44 micrometers (325 ISO sieve designation) and 2.00 mm (10 ISO sieve designation) or preferably 90% of the particle by weight between 63 micrometers (230 ISO sieve designation) and 2.00 mm (10 ISO sieve designation). We believe that seed grinds having a higher percentage of larger particle sizes will have a slower release of benefits to a plant over time and that seed grinds having a higher percentage of lower particles sizes will have a faster release of benefits to a plant over time. Thus, the size of the seed grind can be adjusted for the particular application as desired.

Based on the chemical formula for corn starch, the percent carbon present in corn starch is 46.8%. According to Xue, the carbon in rice grain is 53-64% (Xue, W-ei, "Evaluation of biophysical factors driving temporal variations in carbon gain, water use and yield production in rice," Thesis, Lanzhou University, January 2015).

Prior to applying the invention, water may be added. A preferable amount of water used is such that the final mixture is 80 to 99.99% water, more preferably 90 to 99.9% water, and more preferably 95 to 99.8% water. Irrigation water can be used.

The invention can be applied to the soil with or without added water either by applying to the surface of the soil and then watering into the soil or applying beneath the soil surface or mechanically working into the soil.

Unless otherwise stated in this description, all percent amounts are weight percent based on the total weight of the composition. For the components of the invention, all of the % compositions are calculated as weight percent of the total composition on a dry basis; or in other words, they are calculated as a percent of the total weight without added water. Thus, for suspensions, slurries and dispersions, the amount of the active ingredients can be determined before adding water and non-active ingredients such as for example fillers.

A source of carbohydrate of the plant growth enhancer can be one or more selected from the group of carbohydrates such as starches such as corn starch or rice starch; sugars such as sucrose; seed grinds such as rice seed grind, wheat seed grind, or corn seed grind; or a combination of the carbohydrate sources.

A source of nitrogen of the inventive fertilizer is preferably urea but can include other sources of nitrogen such as ammonium sulfate, ammonium nitrate, and potassium nitrate, monoammonium phosphate diammoniumum phosphate, to name a few. The urea employed in the inventive fertilizer can be substituted or supplemented with compounds selected from the group consisting of ureaform, urea formaldehyde, methylene urea, methylene diurea or dimethylenetriurea.

In addition to nitrogen, the inventive fertilizer includes a source of carbohydrate selected from a group of sources carbohydrates such as starches such as corn starch and rice starch; sugars such as sucrose; seed grinds such as rice seed grind, wheat seed grind, or corn seed grind; or a combination of carbohydrate sources.

In a one embodiment of the invention, the source of nitrogen is 10% to 96%; the source of carbohydrate is 1% to 40%; the source of carbon dioxide is 1% to 50%; and the source of acid is up to 2%. The fertilizer can be placed beneath the soil 1.3-25.4 cm (0.5-10 inches) deep and more preferably 5.1-12.7 cm (2-5 inches) deep early in the plant's growth. Alternatively, the fertilizer may be applied to the surface of the soil and mechanically incorporated into the soil or moved into the soil with water. Ideally, the depth is chosen to make the fertilizer available in the root zone of the plant early in the plant growth preferably at planting the seed or within a week of planting the seed. When planting a seedling, the fertilizer can be placed at the time of planting. Additional applications of the fertilizer can be applied as desired. For example, additional applications of the fertilizer can be applied preferably up to 35 days after a first application.

In one preferred method of the invention, the inventive fertilizer is applied to paddy rice seedlings at a carbon dioxide level of 10 $g/m^2$ to 100 $g/m^2$ with or after planting the seed and prior to transplanting the plants. The inventive fertilizer can be applied to rice in the field at a carbon dioxide level of 5 kg/hectare to 50 kg/hectare either just before, at, or after the paddy rice is transplanted. A single application of the fertilizer may also be used.

In another preferred method of the invention, the inventive fertilizer is applied to rice that is planted directly in the field as seed at a carbon dioxide level of 5 kg/hectare to 50 kg/hectare at or up to one week after planting. The inventive fertilizer can be applied again to rice in the field at a level of 5 kg/hectare to 50 kg/hectare from 1 week after planting up to the five leaf stage of the rice plant. A single application of inventive fertilizer may also be used.

When used to grow rice, the invention provides an unexpected increase in crop yield of up to 60% or more, an increase in carbon uptake of up to 60% or more, an increase in nitrogen uptake of up to 60% or more, and an increase in protein levels in the rough rice of up to 10% or more.

Elevated carbon dioxide levels in the atmosphere are of concern for human health, our climate, and the balance of ecosystems. According to a study at the Harvard School of Public Health (Myers, S. S., et al. "Rising $CO_2$ threatens human nutrition." Nature 510 (Jun. 5, 2014): 139-142), rice plants grown with elevated atmospheric carbon dioxide produced rice with lower protein levels. However, the present invention shows an unexpected benefit that with increased carbon uptake by the rice plant there is a corresponding increase of up to 10% or more in the protein levels in the rice.

An effective method of the invention includes the following:

1) Performing soil tests to identify primary nutrient, secondary nutrient, and micronutrient deficiencies; 2) Applying starter nutrients to the soil early in the crop growth at the levels recommended for the crop being grown and based on the expected crop yield per acre and the soil test results; 3) Applying the inventive fertilizer to the soil early in the crop growth before, at, with, or after applying the starter nutrients by burying the fertilizer, side applying the fertilizer, mechanically incorporating the fertilizer, broadcasting the fertilizer, injecting the fertilizer, spraying the fertilizer, or any combination of these at the levels recommended for the crop being grown and based on the expected crop yield per acre and the soil test results.

Preferably, the fertilizer includes a source of nitrogen, a source of carbon dioxide, a source of acid; and a source of carbohydrate, which provides the most improved growth rates. However, if desired the invention can be practiced using a source of nitrogen, a source of carbon dioxide, and a source of acid without a source of carbohydrate or alternatively a source of nitrogen, a source of carbon dioxide, and a source of carbohydrate without a source of acid, which both provide enhanced growth rates. For example, when the soil is already acidic within a desired pH range, no source of acid may be necessary.

Examples

Tests are underway showing that with the inventive fertilizer supplied to early plant roots produces improvement in plant growth and increased crop yield of up to 20% as compared to plants grown without the inventive fertilizer.

While only a few exemplary embodiments of this invention have been described in detail, those skilled in the art will recognize that there are many possible variations and modifications which can be made in the exemplary embodiments while yet retaining many of the novel and advantageous features of this invention. Accordingly, it is intended that the following claims cover all such modifications and variations.

The invention claimed is:

1. A method of enhancing growth of plants comprising:
    applying a fertilizer comprising a source of nitrogen, a source of carbon dioxide, a source of acid in an amount to increase retention of carbon dioxide released from the source in soil and increase the availability of carbon dioxide to the plant, and a source of carbohydrate to soil containing a plant; and
    allowing the source of nitrogen to release nitrogen to the plant and soil, the source of carbon dioxide to release carbon dioxide to the plant and soil, and the source of acid to reduce the pH to increase retention of the carbon dioxide in the soil, wherein the nitrogen, carbon dioxide and carbohydrate provide enhanced growth to the plant, increased crop yield of the plant, improved efficiency of nitrogen uptake by the plant, improved nitrogen levels in the plant, and increased plant uptake of carbon by the plant, wherein the source of carbon dioxide comprises at least one of dry ice, carbon dioxide gas, liquid carbon dioxide, a solution of carbon dioxide, a suspension containing carbon dioxide, or a slurry containing carbon dioxide.

2. The method according to claim 1, further comprising enhancing the growth of rice.

3. The method according to claim 1, wherein the plant is a seed or seedling.

4. The method according to claim 1, further comprising applying the fertilizer beneath the soil from about 0.5 to about 10 inches deep to apply the fertilizer to roots of the plant.

5. The method according to claim 1, wherein the fertilizer is moved under the soil by use of water or mechanical incorporation.

6. The method according to claim 1, further comprising conducting additional applications of the fertilizer after a first application.

7. The method according to claim 1, wherein the fertilizer is applied to paddy rice seedlings at a carbon dioxide level of 10 $g/m^2$ to 100 $g/m^2$ with or after planting the seed and prior to transplanting the plants.

8. The method according to claim 1, wherein the fertilizer is applied to paddy rice in a field at a carbon dioxide level of 5 kg/hectare to 50 kg/hectare either just before, at, or after the paddy rice is transplanted.

9. The method according to claim 1, wherein a ratio of a weight of the source of carbon dioxide to a weight of source of carbohydrate is between 10:1 and 0.5:1.

10. The method according to claim 1, wherein the source of acid is present in amount to a provide pH of between 4.5 and 6 measured by forming an aqueous solution of the source of nitrogen, the source of carbon dioxide, the source of acid, and the source of carbohydrate.

11. The method according to claim 1, wherein the fertilizer is in solid, semi-solid, or liquid form.

12. The method according to claim 1, wherein the source of carbon dioxide comprises dry ice.

13. The method according to claim 1, wherein the source of carbohydrate comprises at least one of seed grind, starch, or sugar.

14. The method according to claim 1, wherein the source of acid comprises at least one of phosphoric acid, sulfuric acid, nitric acid, hydrochloric acid, or an organic acid.

15. The method according to claim 1, wherein the plant is a seed or seedling.

16. A method of enhancing growth of plants comprising:
    applying a fertilizer comprising a source of nitrogen, a source of carbon dioxide, a source of acid in an amount to increase retention of carbon dioxide released from the source in soil and increase the availability of carbon dioxide to the plant, and a source of carbohydrate to soil containing a plant; and
    allowing the source of nitrogen to release nitrogen to the plant and soil, the source of carbon dioxide to release carbon dioxide to the plant and soil, and the source of acid to reduce the pH to increase retention of the carbon dioxide in the soil, wherein the nitrogen, carbon dioxide and carbohydrate provide enhanced growth to the plant, increased crop yield of the plant, improved efficiency of nitrogen uptake by the plant, improved nitrogen levels in the plant, and increased plant uptake of carbon by the plant, further comprising using brown rice seed grind as the source of carbohydrate.

17. A method of enhancing growth of plants comprising:
    applying a fertilizer comprising a source of nitrogen, a source of carbon dioxide, a source of acid in an amount to increase retention of carbon dioxide released from the source in soil and increase the availability of carbon dioxide to the plant, and a source of carbohydrate to soil containing a plant; and
    allowing the source of nitrogen to release nitrogen to the plant and soil, the source of carbon dioxide to release carbon dioxide to the plant and soil, and the source of acid to reduce the pH to increase retention of the carbon dioxide in the soil, wherein the nitrogen, carbon dioxide and carbohydrate provide enhanced growth to the plant, increased crop yield of the plant, improved efficiency of nitrogen uptake by the plant, improved nitrogen levels in the plant, and increased plant uptake of carbon by the plant, wherein the source of carbohydrate is a seed grind formed from a same type of plant to be grown.

18. A fertilizer comprising:
    a source of nitrogen;
    a source of carbon dioxide;
    a source of acid in an amount to increase retention of carbon dioxide released from the source in soil and increase the availability of carbon dioxide to a plant; and
    a source of carbohydrate, wherein the fertilizer provides increased plant crop yield, improve efficiency of nitrogen uptake by the plant, improved nitrogen levels in the plant, and increased plant uptake of carbon by the plant, wherein the source of carbon dioxide comprises at least one of dry ice, carbon dioxide gas, liquid carbon dioxide, a solution of carbon dioxide, a suspension containing carbon dioxide, or a slurry containing carbon dioxide.

19. The fertilizer according to claim 18, wherein the source of nitrogen is 10% to 96%, the source of carbohydrate is 1% to 40%, the source of carbon dioxide is 1% to 50%; and the source of acid is up to 2%.

20. The fertilizer according to claim 18, wherein the source of acid is present in an amount to provide a pH of between 4.5 and 6 measured by forming an aqueous solution of the source of nitrogen, the source of carbon dioxide, the source of acid, and the source of carbohydrate.

21. The fertilizer according to claim 18, wherein the fertilizer is in solid, semi-solid, or liquid form.

22. The fertilizer according to claim 18, wherein the source of carbon dioxide comprises dry ice.

23. The fertilizer according to claim 18, wherein the source of carbohydrate comprises at least one of seed grind, starch, or sugar.

24. The fertilizer according to claim 18, wherein the source of acid comprises at least one of phosphoric acid, sulfuric acid, nitric acid, hydrochloric acid, or an organic acid.

25. A fertilizer comprising:
a source of nitrogen;
a source of carbon dioxide;
a source of acid in an amount to increase retention of carbon dioxide released from the source in soil and increase the availability of carbon dioxide to a plant; and
a source of carbohydrate, wherein the fertilizer provides increased plant crop yield, improve efficiency of nitrogen uptake by the plant, improved nitrogen levels in the plant, and increased plant uptake of carbon by the plant, wherein the source of carbohydrate is a seed grind formed from a same type of plant to be grown.

26. A fertilizer comprising:
a source of nitrogen;
a source of carbon dioxide;
a source of acid in an amount to increase retention of carbon dioxide released from the source in soil and increase the availability of carbon dioxide to a plant; and
a source of carbohydrate, wherein the fertilizer provides increased plant crop yield, improve efficiency of nitrogen uptake by the plant, improved nitrogen levels in the plant, and increased plant uptake of carbon by the plant, wherein the source of carbohydrate comprises brown rice seed grind.

27. A fertilizer comprising:
a source of nitrogen;
a source of carbon dioxide; and
a source of acid in an amount to increase retention of carbon dioxide released from the source in soil and increase the availability of carbon dioxide to a plant, wherein the fertilizer provides increased plant growth rate, increased crop yield of the plant, improved efficiency of nitrogen uptake by the plant, improved nitrogen levels in the plant, and increased plant uptake of carbon by the plant, wherein the source of carbon dioxide comprises at least one of dry ice, carbon dioxide gas, liquid carbon dioxide, a solution of carbon dioxide, a suspension containing carbon dioxide, or a slurry containing carbon dioxide.

28. A fertilizer comprising:
a source of nitrogen;
a source of carbon dioxide; and
a source of carbohydrate, wherein the plant fertilizer provides increased plant growth rate, increased crop yield of the plant, improved efficiency of nitrogen uptake by the plant, improved nitrogen levels in the plant, and increased plant uptake of carbon by the plant, wherein the source of carbon dioxide comprises at least one of dry ice, carbon dioxide gas, liquid carbon dioxide, a solution of carbon dioxide, a suspension containing carbon dioxide, or a slurry containing carbon dioxide.

29. A fertilizer comprising:
a source of nitrogen;
a source of carbon dioxide; and
a source of carbohydrate, wherein the plant fertilizer provides increased plant growth rate, increased crop yield of the plant, improved efficiency of nitrogen uptake by the plant, improved nitrogen levels in the plant, and increased plant uptake of carbon by the plant, wherein the source of carbohydrate is a seed grind formed from a same type of plant to be grown.

30. A fertilizer comprising:
a source of nitrogen;
a source of carbon dioxide; and
a source of carbohydrate, wherein the plant fertilizer provides increased plant growth rate, increased crop yield of the plant, improved efficiency of nitrogen uptake by the plant, improved nitrogen levels in the plant, and increased plant uptake of carbon by the plant, wherein the source of carbohydrate comprises brown rice seed grind.

* * * * *